UNITED STATES PATENT OFFICE.

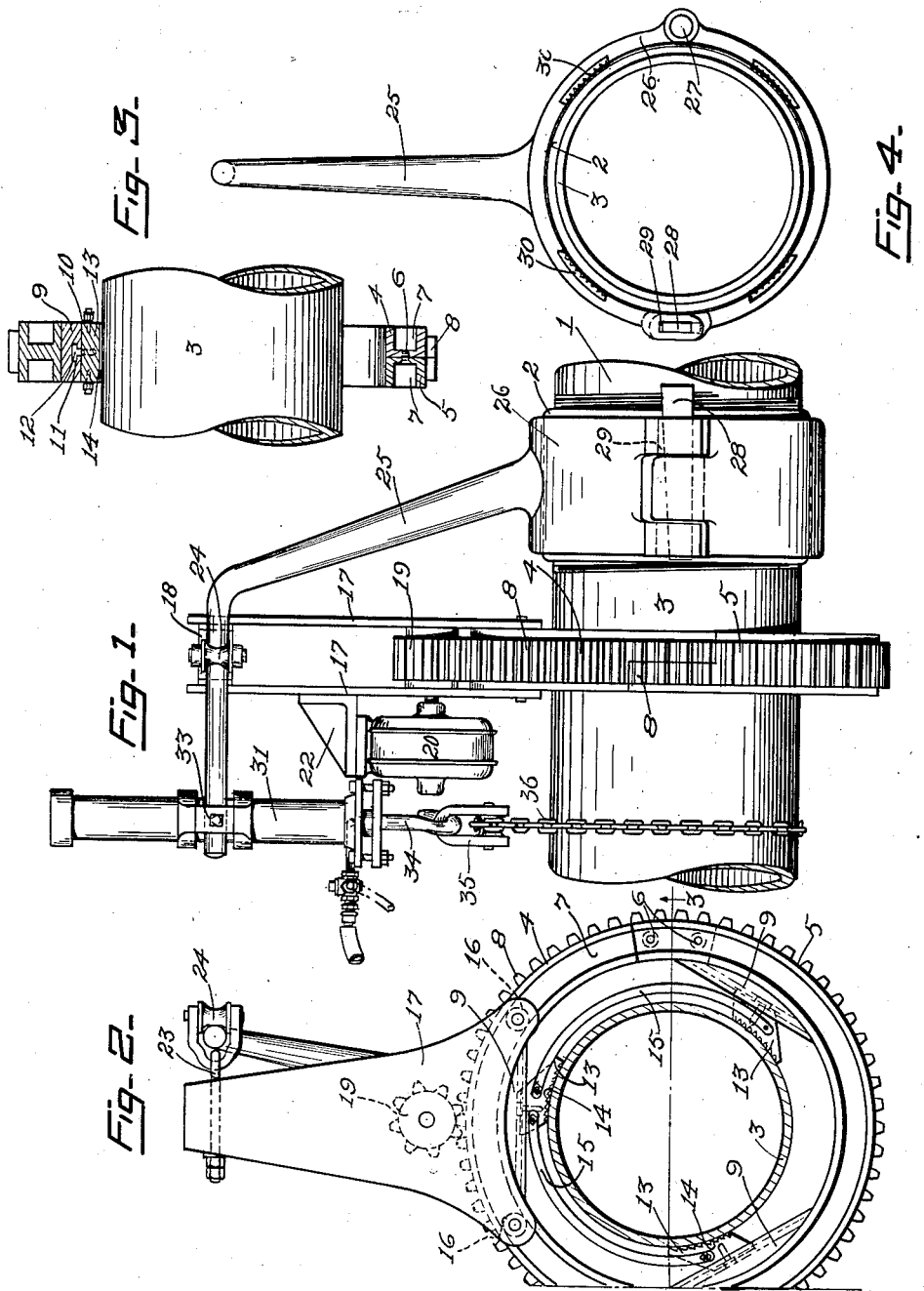

HARRY E. AINE, OF RICHMOND, CALIFORNIA, ASSIGNOR TO CONTINUOUS WIRE WOUND PIPE COMPANY, OF SAN FRANCISCO, CALIFORNIA, A CORPORATION OF CALIFORNIA.

PIPE-LAYING MACHINE.

1,177,915.  Specification of Letters Patent.  Patented Apr. 4, 1916.

Application filed April 12, 1915. Serial No. 20,742.

*To all whom it may concern:*

Be it known that I, HARRY E. AINE, a citizen of the United States, residing at Richmond, in the county of Contra Costa and State of California, have invented certain new and useful Improvements in Pipe-Laying Machines, of which the following is a specification.

The present invention relates to pipe laying machines and particularly to a type of machine designed for threading the laid and stabbed pipe sections into their associated collars while positioned in the trench in which the pipe line is laid.

The invention has for its objects to provide an apparatus which dispenses with the supporting frame work for preventing the rotation of the apparatus, and to provide one having means for coöperating with the completed pipe sections to maintain the apparatus in operative position, to provide an apparatus which is capable of being rapidly positioned over or removed from a section of pipe, thereby enabling the device to be employed in the repairing of pipe lines, and to provide an apparatus which is provided with pipe engaging means which securely engage the pipe and prevent the apparatus from moving relative thereto when the pipe is being tightened.

The invention consists in a clamping means having an arm extended therefrom and for attachment to one section of pipe, a winding annulus having pipe engaging means for positioning over a section of pipe to be tightened and the annulus provided with supporting and operating means coöperating with the arm to prevent the operating means from rotating relative to the pipe.

With the above mentioned and other objects in view, the invention consists in the novel construction and combination of parts hereinafter described; illustrated in the accompanying drawings, and pointed out in the claims hereto appended; it being understood that various changes in the form, proportion, size and minor details of construction within the scope of the claims may be resorted to without departing from the spirit or sacrificing any of the advantages of the invention.

To comprehend the invention reference is directed to the accompanying drawings, wherein—

Figure 1 is a view in side elevation of an embodiment of my invention in position on the pipe. Fig. 2 is an end view of the annulus, disclosing the pipe engaging dogs carried thereby. Fig. 3 is a vertical cross sectional view of the rotatable annulus, disclosing one of the slotted key ways in which the engaging dogs slide. Fig. 4 is an end view of the split ring for clamping around the pipe collar, and disclosing the arm thereon for coöperation with the power mechanism of the annulus.

Referring more particularly to the drawings, wherein like characters of reference designate corresponding parts throughout the several views, the numeral 1 indicates a section of pipe which has been tightened into the collar of a coöperating section not shown, and said section 1 carries a collar 2 into which fits the end of a pipe section 3 which has not been tightly threaded to the collar 2.

Surrounding the pipe section 3 in spaced relation thereto is an annulus formed of the sections 4 and 5 detachably secured together by bolts 6. The annulus is provided on opposite sides with the grooves 7 and is formed on its peripheral edge with the gear teeth 8. Suitable supporting guides 9, preferably three in number, are carried on the inner face of the annulus, and the flat faces 10 thereof are formed with a substantially T-shaped opening 11 in which operate the guides 12 carried by suitable tapering dogs 13 which slide longitudinally of the faces 10. The dogs are formed on their gripping face with teeth 14 and are connected together by the links 15 which cause the dogs to operate in unison.

Suitable rollers 16 operate in the grooves 7 and are carried by spaced cheek plates 17 connected at their upper end by a member 18, and between said cheek plates is rotatably mounted a pinion 19 which intermeshes with the teeth 8, and said pinion is driven to rotate the annulus by a motor 20 which receives its power from any suitable source and which is carried by a bracket 22 secured to one of said plates.

The member 18 carries an eye 23 with which coöperates a yoke and roller 24 and said roller operates on an arm 25 upwardly projecting from one section of a split collar 26 which is clamped around the pipe collar 2. The collar is preferably formed in two sections pivotally connected together as at 27, and are adapted to be drawn tightly around the pipe collar 2 by a suitable wedge 28 which fits into registering openings 29. Suitable removable engaging surfaces 30 are carried by the inner face of the sections forming the split ring and said faces are adapted to bite into the collar 2 and prevent the split collar from rotating thereon.

The arm 25 provides a means for preventing the movement circumferentially of the pipe of the power mechanism, and the roller connection between the arm and the power mechanism permits the same to slide longitudinally of the arm as the pipe is threaded into the pipe collar.

A suitable cylinder 31 for receiving compressed air through suitable valve controlled connections 32 associated therewith is removably secured to the arm 25, as at 33, and coöperating with said cylinder is a plunger 34, the hooked lower end portion of which is adapted to engage a clevis 35 from which depends a chain 36 surrounding the pipe section 3. By reversing the position of the dogs 13 of the supporting guides 9 of the annulus, and rotating the annulus in a counter clock winding direction, sections of pipe may be readily unthreaded. The plunger 34 when forced upwardly causes the chain surrounding the pipe section 3 to elevate the outer end thereof and relieve the strain between the threaded end and collar thereof, and permits the pipe to be easily threaded into the collar 2. The cam dogs, by being linked together are caused to operate in unison in engaging the surface of a pipe and cause the pipe to be centered in the annulus. After a section of pipe has been tightened and it is desired to release the clutch dogs, it is only necessary to reverse the movement of the annulus which will cause the clutch dogs to move longitudinally of their runways in a direction away from the pipe. After the clutch dogs have been released the wedge 28 may be removed from the split collar which will release the same from the pipe collar 2, and permit the apparatus to be moved longitudinally of the pipe, by any suitable mechanism, to the next section to be tightened.

My improved apparatus is self supporting on the pipe and does not require any lateral supports or braces to maintain the same rigid, the apparatus is of such size as to permit it to operate on the pipe when the same is in the trench, is light in weight, simple in construction and is capable of being operated at little cost.

Having thus described my invention what I claim is:—

1. An apparatus for threading pipe sections together, comprising a member for detachably securing to a stationary pipe section, an annulus for surrounding a coöperating pipe section to be rotated for threaded connection with the first section, pivotally mounted cam dogs carried by said annulus for engaging said pipe section to cause the same to rotate with said annulus, and a motor coöperating directly with said annulus for rotating the same, said motor contacting with the means carried by the stationary pipe section and prevented thereby from movement with said movable pipe section.

2. An apparatus for threading pipe sections together, comprising an arm for detachably securing to a stationary pipe section, an annulus for surrounding a coöperating pipe section to be rotated for threaded connection with the first section, cam dogs carried by the annulus for detachable engagement with said pipe section, means connecting said cam dogs to cause the same to operate in unison, and power mechanism for rotating said annulus, said power mechanism connected to said arm and thereby prevented from circumferential movement about the pipe.

3. An apparatus for threading pipe sections together, comprising an annulus surrounding a pipe section and which is adapted for threaded connection with another section, gear teeth on the periphery of said annulus, friction clutch mechanism carried by the annulus for engaging the pipe section associated therewith to cause the same to be rotated in unison, a pinion intermeshing with the teeth of said annulus, power mechanism connected to said pinion for rotating said annulus, and means for preventing said power mechanism from rotating with said pipe.

4. An apparatus for threading pipe sections together, comprising an annulus formed in sections and united together around a pipe section in spaced relation thereto and which is adapted for threaded connection with another section, friction engaging means carried by said annulus for engaging the pipe section associated therewith to cause the same to be rotated with said annulus, a motor for rotating said annulus and means for coöperation with said motor to prevent the same from rotating with said annulus, said power mechanism being capable of movement with the annulus toward the threaded joint connection of the pipe sections as the same are threaded together.

5. An apparatus for threading pipe sections together, comprising a split collar for detachably securing to a stationary pipe section, an arm carried by said collar and overhanging a coöperating pipe section to be rotated for threaded connection with the first section, an annulus for surrounding said coöperating pipe section, cam dogs for detachably securing the annulus to its coöperating pipe section, and power mechanism slidably mounted on said arm and adapted to rotate said annulus.

6. An apparatus for threading pipe sections together, comprising means for detachably securing to a stationary pipe section, an arm carried by said means and projecting over a coöperating pipe section to be rotated for threaded connection with the first section, an annulus for surrounding said coöperating pipe section, means for detachably securing the annulus to its coöperating pipe section, pipe elevating means carried by said arm for coöperation with said pipe section mounting said annulus, and power mechanism slidably mounted on said arm and adapted to rotate said annulus.

7. An apparatus for threading or unthreading pipe sections, comprising means for detachably engaging the pipe section to be rotated, means for detachably engaging the pipe section to remain stationary, and power means supported by the last mentioned means and prevented thereby from rotating with the pipe section to be rotated and adapted to co-act with the first mentioned means to cause the same to rotate the pipe section associated therewith.

In testimony whereof I have signed my name to this specification in the presence of two subscribing witnesses.

HARRY E. AINE.

Witnesses:
HARRY H. TOTTEN,
D. B. RICHARDS.